US010041487B2

(12) United States Patent
Kulkarni et al.

(10) Patent No.: US 10,041,487 B2
(45) Date of Patent: *Aug. 7, 2018

(54) COMPRESSOR ASSEMBLY WITH LIQUID SENSOR (71) Applicant: Emerson Climate Technologies, Inc., Sidney, OH (US)

(72) Inventors: Sunil S. Kulkarni, Springboro, OH (US); Ronald L. Van Hoose, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,884

(22) Filed: May 11, 2016

(65) Prior Publication Data

US 2016/0252092 A1    Sep. 1, 2016

Related U.S. Application Data (63) Continuation of application No. 14/470,234, filed on Aug. 27, 2014, now Pat. No. 9,341,187.

(Continued)

(51) Int. Cl.
*F04B 39/02*    (2006.01)
*F04C 23/00*    (2006.01)
(Continued)

(52) U.S. Cl.
CPC .......... *F04B 39/0207* (2013.01); *F04B 35/04* (2013.01); *F04B 39/023* (2013.01);
(Continued)

(58) Field of Classification Search
CPC ................ F04B 39/023; F04B 39/0207; F04B 39/0284; F04C 23/008; F04C 2270/24;
(Continued)

(56) References Cited

U.S. PATENT DOCUMENTS 3,570,311 A    3/1971  Nelson
3,701,138 A *  10/1972 Pulliam ................ G01F 23/247
                                                          338/25

(Continued)

FOREIGN PATENT DOCUMENTS

CN    1058455 A    2/1992
CN    102182671 A    9/2011
(Continued)

OTHER PUBLICATIONS

Office Action regarding Chinese Patent Application No. 201480046756.8, dated Oct. 31, 2016. Translation provided by Unitalen Attorneys at Law.

(Continued)

*Primary Examiner* — Peter J Bertheaud
(74) *Attorney, Agent, or Firm* — Harness, Dickey & Pierce, P.L.C.

(57) ABSTRACT

A compressor may include a shell, a compression mechanism, first and second temperature sensors, and a control module. The shell may define a lubricant sump. The compression mechanism may be disposed within the shell and may be operable to compress a working fluid. The first temperature sensor may be at least partially disposed within the shell at a first position. The second temperature sensor may be at least partially disposed within the shell at a second position that is vertically higher than the first position. The control module may be in communication with the first and second temperature sensors and the pressure sensor and may determine whether a liquid level in the lubricant sump is below a predetermined level based on data received from the first and second temperature sensors.

18 Claims, 9 Drawing Sheets

Related U.S. Application Data (60) Provisional application No. 61/871,936, filed on Aug. 30, 2013.

(51) Int. Cl.

| | | |
|---|---|---|
| *G01F 23/24* | (2006.01) | |
| *F04C 29/02* | (2006.01) | |
| *F04C 29/04* | (2006.01) | |
| *F04C 18/02* | (2006.01) | |
| *F04C 18/107* | (2006.01) | |
| *F04C 18/32* | (2006.01) | |
| *F04B 35/04* | (2006.01) | |
| *F04B 51/00* | (2006.01) | |
| *F04C 18/08* | (2006.01) | |
| *F04C 28/28* | (2006.01) | |

(52) U.S. Cl.
CPC .......... *F04B 39/0284* (2013.01); *F04B 51/00* (2013.01); *F04C 18/02* (2013.01); *F04C 18/0207* (2013.01); *F04C 18/082* (2013.01); *F04C 18/107* (2013.01); *F04C 18/32* (2013.01); *F04C 23/008* (2013.01); *F04C 28/28* (2013.01); *F04C 29/021* (2013.01); *F04C 29/04* (2013.01); *G01F 23/247* (2013.01); *G01F 23/248* (2013.01); *F04B 2201/0402* (2013.01); *F04B 2201/0403* (2013.01); *F04C 2240/809* (2013.01); *F04C 2240/81* (2013.01); *F04C 2270/24* (2013.01); *F04C 2270/86* (2013.01); *F25B 2700/03* (2013.01); *G01F 23/242* (2013.01)

(58) Field of Classification Search
CPC .............. F04C 2270/86; F04C 2240/81; F04C 2240/809; G01F 23/241; G01F 23/242; G01F 23/247; F25B 2700/03
USPC .................. 417/902; 73/295, 304 R, 304 C; 340/618, 620, 622
See application file for complete search history.

(56) References Cited

U.S. PATENT DOCUMENTS

| | | | |
|---|---|---|---|
| 3,744,267 A | 7/1973 | Norbeck | |
| 4,135,186 A | 1/1979 | Minorikawa et al. | |
| 4,490,988 A * | 1/1985 | Vogel ................ | H02H 5/00 340/631 |
| 4,630,477 A | 12/1986 | Murtland, Jr. | |
| 4,720,997 A | 1/1988 | Doak et al. | |
| 5,001,596 A | 3/1991 | Hart | |
| 5,103,368 A | 4/1992 | Hart | |
| 5,370,513 A | 12/1994 | Fain | |
| 5,620,310 A | 4/1997 | Takenaka et al. | |
| 5,719,332 A | 2/1998 | Wallrafen | |
| 5,839,886 A | 11/1998 | Shaw | |
| 6,276,901 B1 | 8/2001 | Farr et al. | |
| 6,546,796 B2 | 4/2003 | Zimmermann et al. | |
| 6,862,932 B2 | 3/2005 | Zimmermann et al. | |
| 6,886,354 B2 | 5/2005 | Dudley | |
| 6,973,828 B2 | 12/2005 | Zimmermann et al. | |
| 7,540,718 B2 | 6/2009 | Funami et al. | |
| 7,568,894 B2 * | 8/2009 | Uratani ................ | F04B 39/0238 417/63 |
| 7,596,998 B2 | 10/2009 | Zimmermann et al. | |
| 7,874,724 B2 | 1/2011 | Okoren et al. | |
| 8,021,125 B2 | 9/2011 | Uratani | |
| 8,177,521 B2 | 5/2012 | Chen et al. | |
| 9,341,187 B2 * | 5/2016 | Brostrom ............ | F04C 29/021 |
| 9,784,274 B2 | 10/2017 | Brostrom et al. | |
| 2002/0102163 A1 | 8/2002 | Dudley | |
| 2003/0046997 A1 | 3/2003 | Waller | |
| 2004/0166008 A1 | 8/2004 | Lai et al. | |
| 2005/0226735 A1 | 10/2005 | Funami et al. | |
| 2005/0254977 A1 | 11/2005 | Aya et al. | |
| 2006/0013697 A1 | 1/2006 | Uratani | |
| 2008/0008604 A1 | 1/2008 | Tolbert | |
| 2008/0250798 A1 | 10/2008 | Okoren et al. | |
| 2009/0101725 A1 | 4/2009 | Dolan et al. | |
| 2011/0085925 A1 | 4/2011 | Fan et al. | |
| 2011/0211973 A1 | 9/2011 | Lee et al. | |
| 2011/0239672 A1 | 10/2011 | Won et al. | |
| 2013/0098100 A1 | 4/2013 | Bonnefoi et al. | |
| 2015/0064040 A1 | 3/2015 | Brostrom et al. | |
| 2016/0319816 A1 | 11/2016 | Brostrom et al. | |
| 2017/0089340 A1 | 3/2017 | Brostrom et al. | |

FOREIGN PATENT DOCUMENTS

| | | |
|---|---|---|
| CN | 102679507 A | 9/2012 |
| DE | 102004035855 A1 | 2/2005 |
| EP | 2578880 A1 | 4/2013 |
| JP | 2001012351 A | 1/2001 |
| JP | 2001-032772 A | 2/2001 |
| JP | 2002317785 A | 10/2002 |
| JP | 2003097443 A | 4/2003 |
| JP | 2006029160 A | 2/2006 |
| WO | WO-2015031639 A1 | 3/2015 |

OTHER PUBLICATIONS

International Search Report regarding International Application No. PCT/US2016/029568, dated Aug. 10, 2016.
Written Opinion of the International Searching Authority regarding International Application No. PCT/US2016/029568, dated Aug. 10, 2016.
International Search Report and Written Opinion of the International Searching Authority regarding Application No. PCT/US2014/053200, dated Nov. 24, 2014.
Office Action regarding U.S. Appl. No. 14/470,234, dated Dec. 11, 2015.
Restriction Requirement regarding U.S. Appl. No. 14/470,234, dated Sep. 28, 2015.
Written Opinion of the International Searching Authority regarding Application No. PCT/US2014/053200, dated Nov. 24, 2014.
Office Action regarding U.S. Appl. No. 15/130,493, dated May 5, 2017.
Restriction Requirement regarding U.S. Appl. No. 15/153,922, dated Dec. 14, 2016.
Office Action regarding U.S. Appl. No. 15/153,922, dated Mar. 15, 2017.
Search Report regarding European Patent Application No. 14839404.2, dated Mar. 24, 2017.
Office Action regarding U.S. Appl. No. 15/130,493, dated Aug. 28, 2017.
Office Action regarding U.S. Appl. No. 15/130,493, dated Nov. 16, 2017.
Notice of Allowance regarding U.S. Appl. No. 15/130,493 dated Apr. 20, 2018.

\* cited by examiner

COMPRESSOR ASSEMBLY WITH LIQUID SENSOR

CROSS-REFERENCE TO RELATED APPLICATIONS

This application is a continuation of U.S. patent application Ser. No. 14/470,234, filed on Aug. 27, 2014, which claims the benefit of U.S. Provisional Application No. 61/871,936, filed on Aug. 30, 2013. The entire disclosures of the above applications are incorporated herein by reference.

FIELD

The present disclosure relates to a compressor assembly with a liquid sensor.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and one or more compressors circulating a working fluid (e.g., refrigerant or carbon dioxide) between the indoor and outdoor heat exchangers. Efficient and reliable operation of the one or more compressors is desirable to ensure that the climate-control system in which the one or more compressors are installed is capable of effectively and efficiently providing a cooling and/or heating effect on demand.

SUMMARY

This section provides a general summary of the disclosure, and is not a comprehensive disclosure of its full scope or all of its features.

In one form, the present disclosure provides a compressor that may include a shell, a compression mechanism, first and second temperature sensors and a control module. The shell may define a lubricant sump. The compression mechanism is disposed within the shell and is operable to compress a working fluid. The first temperature sensor is at least partially disposed within the shell at a first position. The second temperature sensor is at least partially disposed within the shell at a second position that is vertically higher than the first position. The control module may be in communication with the first and second temperature sensors. The control module may determine a difference between a first temperature measurement from the first temperature sensor and a second temperature measurement from the second temperature sensor. The control module may determine whether a liquid level in the lubricant sump is below a predetermined level based on the difference.

In some embodiments, the compressor includes a pressure sensor disposed at least partially within the shell. In some embodiments, the control module may determine whether the liquid level is below the predetermined level based on whether data from the pressure sensor indicates a presence of liquid working fluid in the shell.

In some embodiments, the control module determines whether the liquid level is below the predetermined level based on whether the compressor is on or off.

In some embodiments, the compressor includes a heating element configured to heat liquid within said lubricant sump.

In some embodiments, the control module determines whether the liquid level is below the predetermined level based on whether the heating element is functioning.

In some embodiments, the shell defines a suction chamber containing working fluid that is drawn into the compression mechanism for compression therein during operation of the compressor. The second temperature sensor may be disposed within the suction chamber and may measure a temperature of the working fluid disposed within the suction chamber.

In some embodiments, the liquid level is below said predetermined level when the liquid level is vertically below the first temperature sensor.

In some embodiments, the compressor includes a pressure sensor disposed at least partially within said shell vertically above said predetermined level. The control module may determine whether the liquid level is below the predetermined level based on data from the pressure sensor.

In some embodiments, the compressor includes a first casing defining a first cavity, a first aperture and a first fluid passageway. The first aperture and the first fluid passageway may provide fluid communication between the first cavity and an interior volume of the shell. One of the first and second temperature sensors may be disposed within the first cavity.

In some embodiments, the compressor includes a second casing defining a second cavity, a second aperture and a second fluid passageway. The second aperture and the second fluid passageway may provide fluid communication between the second cavity and the interior volume of the shell. The other of the first and second temperature sensors may be disposed within the second cavity.

In some embodiments, the first and second casings include first and second baffles, respectively, disposed within the first and second cavities, respectively.

In some embodiments, the control module determines whether the liquid level is below the predetermined level based on a first standard deviation of measurements from one of the first and second temperature sensors.

In some embodiments, the control module determines whether the liquid level is below the predetermined level based on a second standard deviation of measurements from the other of the first and second temperature sensors.

In some embodiments, the control module determines whether the liquid level is below the predetermined level based on a comparison of first and second ratios. The first ratio may be a ratio of the difference between the first and second temperature measurements to the first standard deviation. The second ratio may be a ratio of the difference between the first and second temperature measurements to the second standard deviation.

In some embodiments, the control module determines continuously or intermittently recalculates the first and second ratios and stores values of the first and second ratios. The control module may determine whether the liquid level is falling based on whether the stored values of the first ratio are converging toward the stored values of the second ratio.

In some embodiments, the compressor includes a sensor housing receiving the first and second temperature sensors and engaging the shell.

In some embodiments, wires electrically connected to the first and second temperature sensors are routed out of the shell through a passage defined by the sensor housing.

In some embodiments, the sensor housing includes a hub, a conduit, a first casing and a second casing. The hub may extend through the shell. The conduit may extend radially inward into the compressor from the hub and may receive the wires. The first casing may extend axially upward from the conduit and may receive one of the first and second temperature sensors. The second casing may extend axially downward from the conduit and may receive the other of the first and second temperature sensors.

In some embodiments, the first and second casings are axially misaligned with each other.

In some embodiments, the first casing extends axially upward from an intermediate portion of the conduit, and the second casing extends axially downward from a distal end of the conduit.

In some embodiments, the sensor housing receives a pressure sensor. Wires electrically connected to the pressure sensor may be routed away from the shell through a first passage defined by the sensor housing. Wires electrically connected to the first and second temperature sensors may be routed away from the shell through second and third passages defined by the sensor housing.

In another form, the present disclosure provides a method that may include determining a first temperature from a first temperature sensor at a first location within a compressor; determining a second temperature from a second temperature sensor at a second location within the compressor; determining a difference between the first and second temperatures; and determining whether a liquid level in a lubricant sump within the compressor is below a predetermined level based on the difference between the first and second temperatures.

In some embodiments, the second location within the compressor is vertically higher than the first location within the compressor.

In some embodiments, determining whether the liquid level is below the predetermined level includes determining a difference between the first and second temperatures and comparing the difference to a predetermined value.

In some embodiments, the method includes determining a pressure of a fluid within the compressor from a pressure sensor. Determining whether the liquid level is below the predetermined level may include comparing the pressure to a predetermined value.

In some embodiments, determining whether the liquid level is below the predetermined level includes determining whether the compressor is on or off.

In some embodiments, determining whether the liquid level is below the predetermined level includes determining whether a heating element is functioning. The heating element may be configured to heat liquid within the lubricant sump.

In some embodiments, determining whether the liquid level is below the predetermined level includes determining whether liquid working fluid is present within the compressor.

In some embodiments, the method includes determining a first standard deviation of measurements from one of the first and second temperature sensors. Determining whether the liquid level is below the predetermined level may be based on the first standard deviation.

In some embodiments, the method includes determining a second standard deviation of measurements from the other of the first and second temperature sensors. Determining whether the liquid level is below the predetermined level may be based on the second standard deviation.

In some embodiments, the method includes determining first and second ratios. The first ratio may be a ratio of the difference between the first and second temperature measurements to the first standard deviation. The second ratio may be a ratio of the difference between the first and second temperature measurements to the second standard deviation. Determining whether the liquid level is below the predetermined level is based on a comparison of the first and second ratios.

In some embodiments, the method includes continuously or intermittently recalculating the first and second ratios; storing values of the first and second ratios; and determining whether the liquid level is falling based on whether the stored values of the first ratio are converging toward the stored values of the second ratio.

In another form, the present disclosure provides a compressor that may include a shell, first and second temperature sensors, and a control module. The first and second temperature sensors may be at least partially disposed within the shell. The control module may be in communication with the first and second temperature sensors. The control module may determine whether a liquid level in the shell is below a predetermined level based on data received from the first and second temperature sensors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
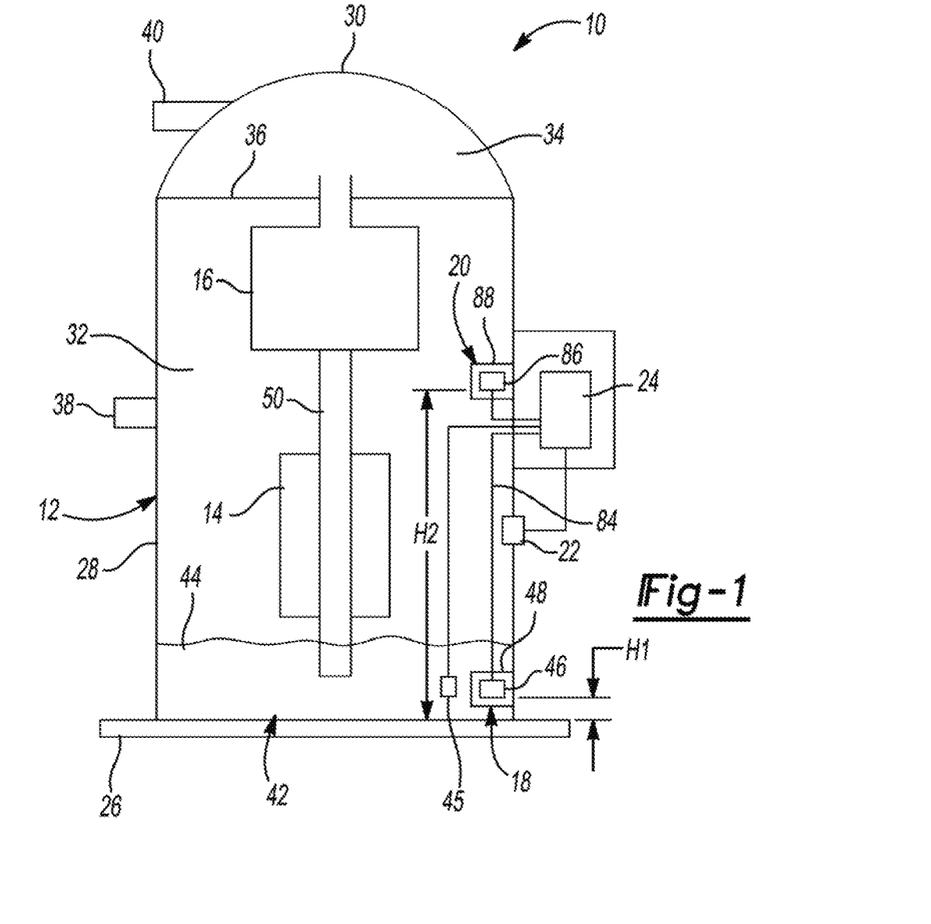
FIG. 1 is a schematic representation of a compressor having sensors and a control module for determining a lubricant level in the compressor according to the principles of the present disclosure.

With reference to FIG. 1, a compressor 10 is provided that may include a shell assembly 12, a motor 14, a compression mechanism 16, a first temperature sensor assembly 18, a second temperature sensor assembly 20, a pressure sensor 22, and a control module 24. The shell assembly 12 may include a base 26, a cylindrical shell 28 and an end cap 30. The shell 28 and the base 26 may define a suction chamber 32. The end cap 30 may define a discharge chamber 34. A partition 36 may separate the suction chamber 32 from the discharge chamber 34. A suction fitting 38 may extend through the shell 28 and communicate with the suction chamber 32. A discharge fitting 40 may extend through the end cap 30 and communicate with the discharge chamber 34.

The base 26 and shell 28 may define a lubricant sump 42 containing a volume of lubricant (e.g., oil or a mixture of oil and refrigerant) at a lubricant level 44. A vertical height of the lubricant level 44 (i.e., the volume of lubricant in the lubricant sump 42) may vary during operation of the compressor 10. A crankcase heater 45 may be disposed in the lubricant sump 42 and may be operable to heat the lubricant within the lubricant sump 42 and/or heat other components of the compressor 10. The control module 24 may be in communication with the crankcase heater 45 and may control operation of the crankcase heater 45 to maintain the lubricant in the lubricant sump 42 at or above a predetermined temperature.

The compression mechanism 16 may be disposed within the shell assembly 12 and may be driven by the motor 14. The compression mechanism 16 may be any type of compression mechanism, such as a scroll, reciprocating, rotary vane or screw type compression mechanism, for example. During operation of the compression mechanism 16, working fluid from the suction chamber 32 may be drawn into the compression mechanism 16 and compressed therein. Compressed working fluid may be discharged from the compression mechanism 16 into the discharge chamber 34 before exiting the compressor 10 though the discharge fitting 40.

The first temperature sensor assembly 18 may include a first temperature sensor 46 and a first casing or slosh guard 48. The first temperature sensor 46 may be disposed within the first slosh guard 48 and may be operable to measure a temperature of fluid (gas and/or liquid) to which the first temperature sensor 46 is exposed. The first temperature sensor assembly 18 may be mounted to any suitable structure to fix the first temperature sensor assembly 18 relative to the shell assembly 12 in a position so that the first temperature sensor 46 is disposed at a first vertical height H1 above the base 26 of the shell assembly 12. For example, the first temperature sensor assembly 18 could be mounted to a lower bearing housing (not shown) that rotatably supports a crankshaft 50 driven by the motor 14 or the first temperature sensor assembly 18 could be mounted to the shell 28. The first vertical height H1 may be a predetermined vertical height that corresponds to a first predetermined lubricant level in the lubricant sump 42 (i.e., a height of the lubricant level 44 when a predetermined threshold amount of lubricant is present in the lubricant sump 42).

In some embodiments, wires 84 electrically connected to the first temperature sensor 46 may be disposed within a wire harness (not shown) that is attached to or disposed within a stator of the motor 14. The wires 84 may extend from the stator to a sealed terminal plug assembly (not shown) in electrical communication with the control module 24.

The first temperature sensor 46 may be in communication with the control module 24 and may be or include a thermocouple, a PTC (positive temperature coefficient) thermistor, an NTC (negative temperature coefficient) thermistor and/or a heat pulse sensor, for example, and/or any other temperature-sensing device. As will be subsequently described, the control module 24 may be operable to determine whether the lubricant level 44 in the lubricant sump 42 is below the first vertical height H1 based on data received from the first temperature sensor 46.

Figure 2:
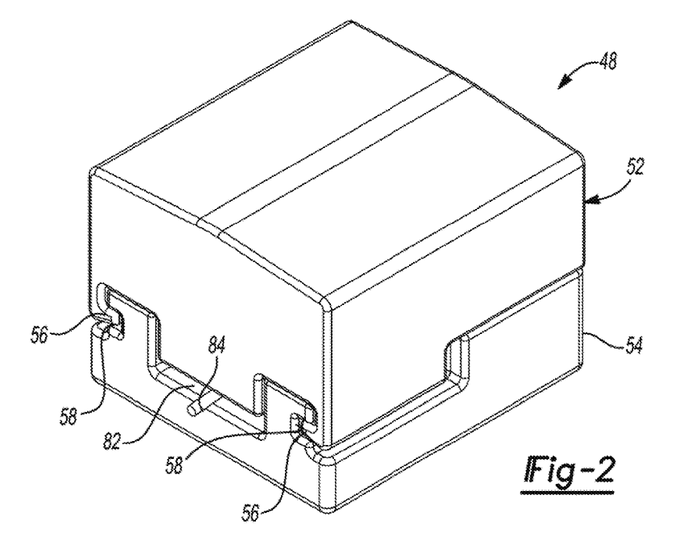
FIG. 2 is a perspective view of a slosh guard for one of the sensors of FIG. 1 according to the principles of the present disclosure.
Figure 3:
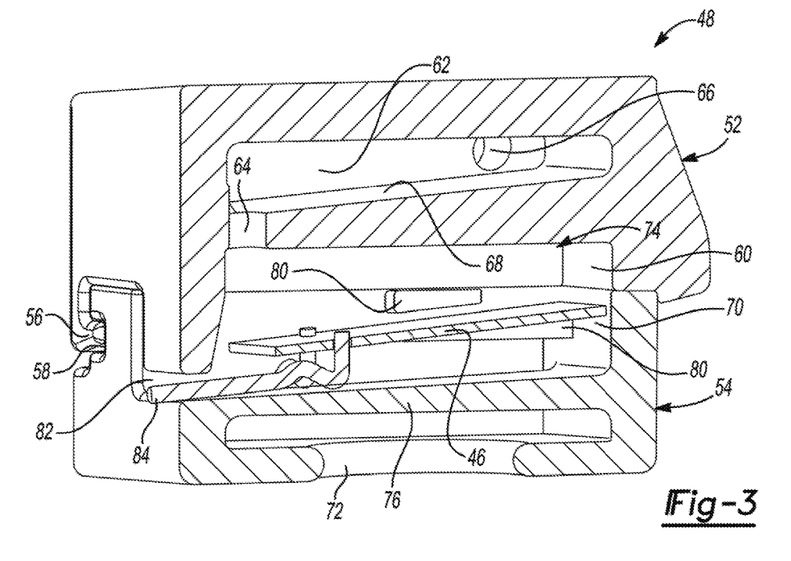
FIG. 3 is a perspective cross-sectional view of the slosh guard of FIG. 2.
Figure 4:
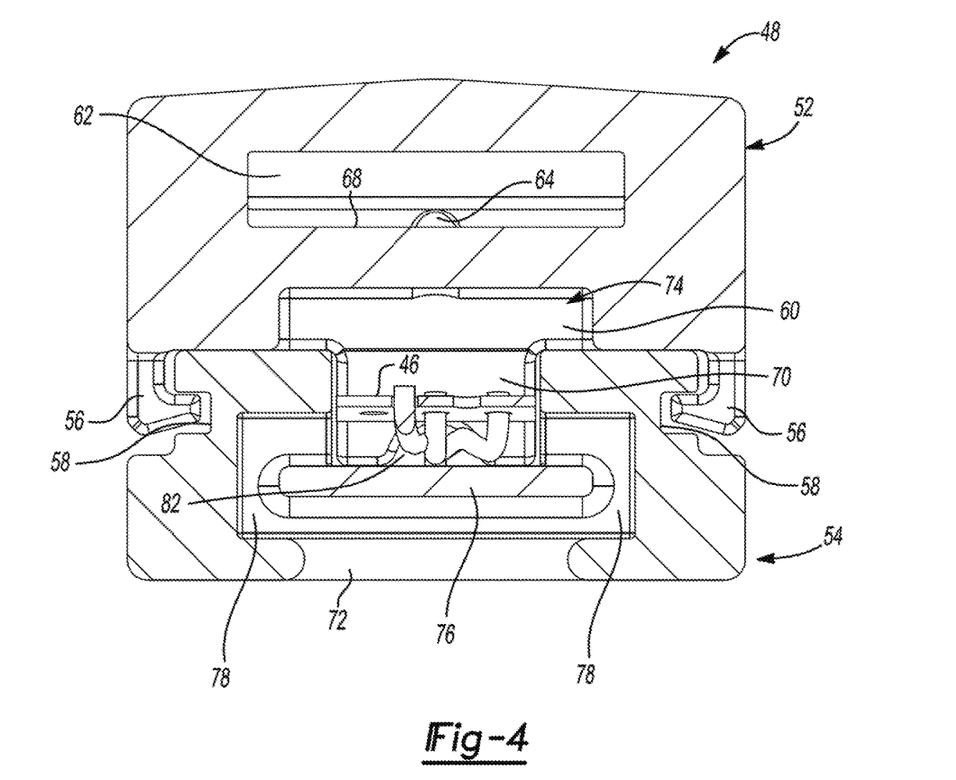
FIG. 4 is a cross-sectional view of the slosh guard of FIG. 2.

Referring now to FIGS. 2-4, the first slosh guard 48 may include a first body 52 and a second body 54. The first and second bodies 52, 54 may be removably attached to each other by a snap fit, press fit and/or one or more fasteners, for example. In the particular configuration shown in FIGS. 2-4, the first body 52 may include a plurality of resiliently flexible fingers 56 that snap into engagement with slots 58 formed in the second body 54.

The first body 52 may include a first recess 60 and a fluid passageway 62 formed therein. As shown in FIG. 3, the fluid passageway 62 may include a first opening 64 providing fluid communication between the first recess 60 and the fluid passageway 62 and a second opening 66 providing fluid communication between the fluid passageway 62 and the interior of the shell assembly 12 (e.g., the lubricant sump 42 or suction chamber 32). In some embodiments, the fluid passageway 62 may include an inclined surface 68 (FIG. 3) that slopes downward from the second opening 66 to the first opening 64 to allow liquid to drain out of the fluid passageway 62 into the first recess 60.

The second body 54 may include a second recess 70 and an aperture 72. The first recess 60 of the first body 52 and the second recess 70 of the second body 54 may cooperate to form a cavity 74 in which the first temperature sensor 46 may be disposed. The second body 54 may include a baffle 76 that traverses the second recess 70 to shield the first temperature sensor 46 from liquid that may splash into the second recess 70 through the aperture 72. As shown in FIG. 4, one or more passages 78 may be formed in around the baffle 76 to allow the cavity 74 to be filled with liquid and allow liquid to be drained from the cavity 74 when a liquid level (e.g., the lubricant level 44) rises and falls above and below the vertical height of the aperture 72. As the cavity 74 fills with liquid when the liquid level rises above the vertical height of the aperture 72, vapor in the cavity 74 may exit through the fluid passageway 62. As liquid drains from the cavity 74 when the liquid level falls, liquid may exit through the aperture 72 and vapor from the suction chamber 32 may enter the cavity 74 through the fluid passageway 62.

The second body 54 may also include a plurality of support tabs 80 (FIG. 3) that cooperate to hold the first temperature sensor 46 in the cavity 74 and spaced apart from the baffle 76. The first and second bodies 52, 54 may also cooperate to define a wire passageway 82 through which wires 84 connected to the first temperature sensor 46 may exit the first slosh guard 48.

Referring again to FIG. 1, the second temperature sensor assembly 20 may include a second temperature sensor 86 and a second casing or slosh guard 88. The second temperature sensor 86 may be disposed within the second slosh guard 88 and may be operable to measure a temperature of fluid (gas and/or liquid) to which the second temperature sensor 86 is exposed. The structure and function of the second slosh guard 88 may be similar or identical to that of the first slosh guard 48, and therefore, the second slosh guard 88 will not be described again in detail. While allowing the second temperature sensor 86 to be exposed to and measure the temperature of vapor working fluid in the suction chamber 32, the second slosh guard 88 may shield the second temperature sensor 86 from liquid (e.g., lubricant and/or liquid working fluid) that may drip or be flung off of a component of the compressor 10, lubricant that is splashed up from the lubricant sump 42, and/or liquid working fluid flowing into the suction chamber 32 from the suction fitting 38.

The second temperature sensor assembly 20 may be mounted to any suitable structure to fix the second temperature sensor assembly 20 relative to the shell assembly 12 in a position so that the second temperature sensor 86 is disposed at a second vertical height H2 above the base 26 of the shell assembly 12. For example, the second temperature sensor assembly 20 could be mounted to an upper bearing housing (not shown) that rotatably supports the crankshaft 50 or the second temperature sensor assembly 20 could be mounted to the shell 28 or to an oil drain tube connected to the upper bearing housing. The second vertical height H2 is vertically higher than the first vertical height H1 and may be higher than a predetermined maximum expected lubricant level in the lubricant sump 42. That is, the second vertical height H2 may be at or above a height of the lubricant level 44 associated with a lubricant-overfill or a lubricant-flood condition, for example.

The second temperature sensor 86 may be in communication with the control module 24 and may be or include a thermocouple, a PTC (positive temperature coefficient) thermistor, an NTC (negative temperature coefficient) thermistor and/or a heat pulse sensor, for example, and/or any other temperature-sensing device. As will be subsequently described, the control module 24 may be operable to determine whether the lubricant level 44 in the lubricant sump 42 is below the first vertical height H1 based on data received from the second temperature sensor 86.

While the first and second temperature sensor assemblies 18, 20 are described above as including the first and second slosh guards 48, 88, respectively, it will be appreciated that, in some embodiments, only one of the temperature sensor assemblies 18, 20 may include a slosh guard or neither of the temperature sensor assemblies 18, 20 may include a slosh guard.

The pressure sensor 22 may be operable to measure a pressure of working fluid in the suction chamber 32. The pressure sensor 22 may be mounted to any suitable structure within the shell assembly 12 and may be fixed relative to the shell assembly 12 in a position so that the pressure sensor 22 is disposed above the predetermined maximum expected lubricant level. While the pressure sensor 22 is shown in FIG. 1 as being below the second vertical height H2, in some embodiments, the pressure sensor 22 could be at or above the vertical height H2. For example, the pressure sensor 22 could be mounted to the upper bearing housing or the shell 28. In some embodiments, the pressure sensor 22 could extend through the shell 28, as shown in FIG. 1. In some embodiments, the pressure sensor 22 could be disposed in a suction line (not shown) that fluidly couples the suction fitting 38 with a heat exchanger (e.g., an evaporator) of the climate control system in which the compressor 10 is installed. In some embodiments, the pressure sensor 22 may be mounted at or below the predetermined maximum expected lubricant level.

The pressure sensor 22 may be in communication with the control module 24 and may be or include a force-collector type pressure sensor (e.g., a sensor having a diaphragm, piston, bourdon tube or bellow to measure strain or deflection over an area), a resonant type pressure sensor (sensing changes in resonant frequency to measure changes in fluid density), and/or a thermal type pressure sensor (sensing changes in thermal conductivity of a fluid), for example, and/or any other pressure-sensing device. As will be subsequently described, the control module 24 may be operable to determine whether the lubricant level 44 in the lubricant sump 42 is below the first vertical height H1 based on data received from the pressure sensor 22.

As described above, the control module 24 may be in communication with the first and second temperature sensors 46, 86, the pressure sensor 22 and the crankcase heater 45. The control module 24 may also be in communication with and control operation of the motor 14 and/or other components of the compressor 10 and/or the climate control system.

Figure 5:
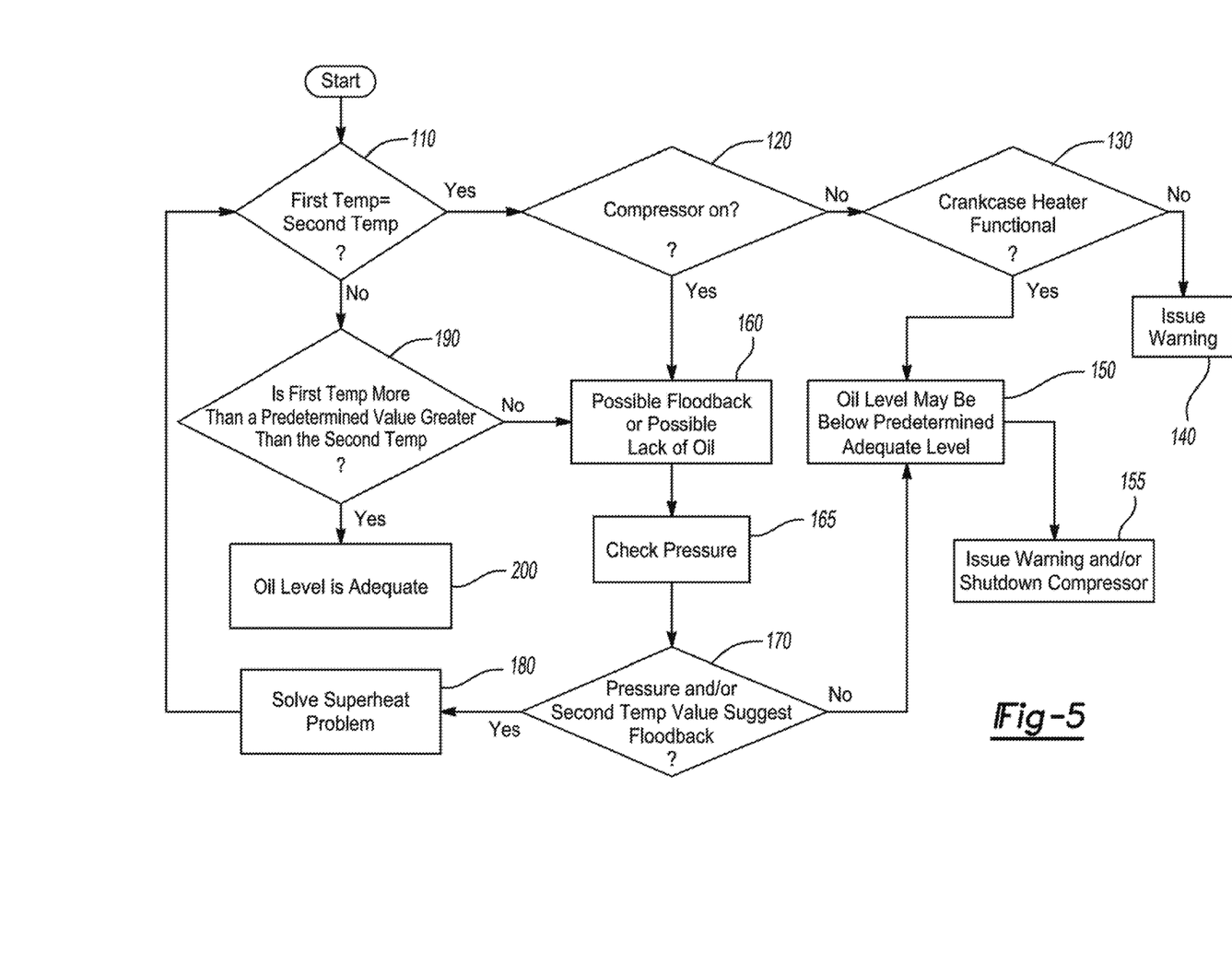
FIG. 5 is a flow chart illustrating a method for determining the lubricant level.

Referring now to FIG. 5, a method 100 will be described in which the control module 24 may determine whether the lubricant level 44 is below the first vertical height H1 based on information from the first temperature sensor 46, the second temperature sensor 86 and/or the pressure sensor 22. The sensors 46, 86, 22 may continuously or intermittently communicate temperature and pressure data to the control module 24, and the control module 24 may continuously or intermittently determine whether the lubricant level 44 is below the first vertical height H1 based on such data.

In some compressors, the lubricant level 44 in the lubricant sump 42 may be considered to be adequate if the lubricant level 44 is vertically at or above the first vertical height H1 (that is, the first vertical height H1 may selected to correspond to a chosen level for a particular compressor and/or application). Therefore, when the lubricant level 44 is at an adequate level, lubricant will at least partially fill the cavity 74 in the slosh guard 48 (at least up to the first temperature sensor 46), and therefore, the first temperature sensor 46 will be measuring a temperature of the lubricant in the lubricant sump 42. When the lubricant level 44 is below an adequate level (i.e., below the first vertical height H1), lubricant will have drained out of the slosh guard 48, thereby exposing the first temperature sensor 46 to working fluid in the suction chamber 32. Accordingly, the first temperature sensor 46 will measure the temperature of working fluid in the suction chamber 32 when the lubricant level 44 is below an adequate level.

During normal operation of the compressor 10, the temperature of the lubricant in the lubricant sump 42 may be greater than the temperature of the working fluid in the suction chamber 32. When the compressor 10 is not operating or is in a standby mode, the crankcase heater 45 may maintain the lubricant at a temperature that is above the temperature of the working fluid in the suction chamber 32.

If the first temperature sensor 46 measures a temperature value that is not greater than a temperature value measured by the second temperature sensor 86, then one of a plurality of conditions may be present. A first one of the plurality of conditions may be that the compressor 10 is not operating (e.g., the compressor is turned off). A second one of the plurality of conditions may be that the compressor 10 is operating under a flood-back condition, whereby a mixture of liquid and vapor working fluid is drawn into the suction chamber 32 (e.g., as may occur when the climate control system is switching between heating and cooling modes or switching into or out of a defrost mode). A third one of the plurality of conditions may be that the lubricant level 44 is below the predetermined adequate level. Using the method 100, the control module 24 may determine which of the plurality of conditions is present and whether the lubricant level 44 is below the predetermined adequate level.

At step 110 of the method 100, the control module 24 may determine whether a first temperature value T1 from the first temperature sensor 46 is equal to a second temperature value T2 from the second temperature sensor 86. If the first temperature value T1 is equal to or approximately equal to the second temperature value T2, the control module 24 may determine, at step 120, if the compressor 10 is operating. As described above, the control module 24 may control operation of the motor 14, and therefore, the control module 24 may determine whether the motor 14 is operating based on control feedback and/or whether the motor 14 is receiving electrical current. If the control module 24 determines at step 120 that the compressor 10 is not operating, the control module 24 may determine, at step 130 if the crankcase heater 45 is operating or if it is functional (e.g., by determining if the crankcase heater 45 is receiving electrical current). If the control module 24 determines that the crankcase heater 45 is not functional or is not operating, the control module 24 may generate a warning at step 140 indicating a fault with the crankcase heater 45. The warning may be in the form of an audible and/or visual alarm on the compressor 10 and/or a warning or fault signal sent to a remote protection, control and/or diagnostic system for the compressor 10 and/or the climate control system, for example. The warning generated at step 140 may also advise a person to visually check the lubricant level 44 (e.g., through a lubricant level sight glass).

If, at step 130, the control module 24 determines that the crankcase heater 45 is operating correctly and the crankcase heater 45 been operating for at least a predetermined time period (e.g., a long enough time to allow the crankcase heater 45 to warm the lubricant within the lubricant sump 42), the control module 24 may determine that the lubricant level 44 is below the predetermined adequate level at step 150. The control module 24 may then, at step 155, generate a warning and/or shutdown the compressor 10. The warning may be in the form of an audible and/or visual alarm on the compressor 10 and/or a warning or fault signal sent to a remote protection, control and/or diagnostic system for the compressor 10 and/or the climate control system, for example. The warning at step 155 may also advise a person to add lubricant and/or perform service on the compressor 10 and/or the climate control system.

If, at step 120, the control module 24 determines that that the compressor 10 is operating, the control module 24 may determine at step 160 that the compressor 10 is operating under a flood-back condition and/or the lubricant level 44 is below the predetermined adequate level. At step 165, the control module 24 may acquire pressure data from the pressure sensor 22. At step 170, the control module 24 may determine whether data from the pressure sensor 22 and/or data from the second temperature sensor 86 indicate a liquid flood-back condition by comparing the measured values with predetermined ranges of values that are known to indicate a flood-back condition for a particular compressor, refrigerant, refrigerant blend and/or climate control system. If the data from the pressure sensor 22 and/or data from the second temperature sensor 86 do not indicate a liquid flood-back condition, the control module 24 may determine at step 150 that the lubricant level 44 is below the predetermined adequate level. Then, at step 155, the control module 24 may generate the warning described above and/or shutdown the compressor 10. If the data from the pressure sensor 22 and/or data from the second temperature sensor 86 indicate a liquid flood-back condition at step 170, the control module 24 may, at step 180, take steps to alleviate or correct the flood-back condition. The steps to alleviate or correct the flood-back condition could include changing a control setting for the compressor 10 (e.g., changing a capacity of the compressor) and/or a control setting for the climate control system (e.g., changing condenser fan and/or evaporator fan speeds, changing timing, amount and/or duration that an expansion valve is open or closed). After step 180, the control module 24 may loop back to step 110.

If, at step 110, the control module 24 determines that the first temperature value T1 is not equal to the second temperature value T2, the control module 24 may, at step 190, determine if the first temperature value T1 is greater than the second temperature value T2 by more than a predetermined difference. In some embodiments, the predetermined difference may be about five degrees Fahrenheit, for example. The predetermined difference can be any value chosen to suit a particular compressor, refrigerant, refrigerant blend and/or application. If the control module 24 determines that the first temperature value T1 is greater than the sum of the second temperature value T2 and the predetermined difference, then the control module 24 may determine at step 200 that the lubricant level 44 is at or above the predetermined adequate level (i.e., at or above the first vertical height H1). If the control module 24 determines at step 190 that the first temperature value T1 is not greater than the sum of the second temperature value T2 and the predetermined difference, then the control module 24 may repeat steps 160, 170, 150 and 155, as described above, or repeat steps 160, 170 and 180, as described above.

In some embodiments, the compressor 10 may include a plurality of first temperature sensor assemblies 18 each disposed at a different vertical height above the base 26. In such embodiments, the control module 24 may determine which of the first temperature sensor assemblies 18 are above and below the lubricant level 44 by comparing data from each of the first temperature sensor assemblies 18 with data from the second temperature sensor assembly 20 in the manner described above. In this manner, the control module 24 could determine a height of the lubricant level 44.

In some embodiments, the control module 24 may also be operable to determine viscosity of the lubricant in the lubricant sump 42 based on data from one or more of the sensors 22, 46, 86 and/or other compressor conditions and parameters.

Figures 6, 7:
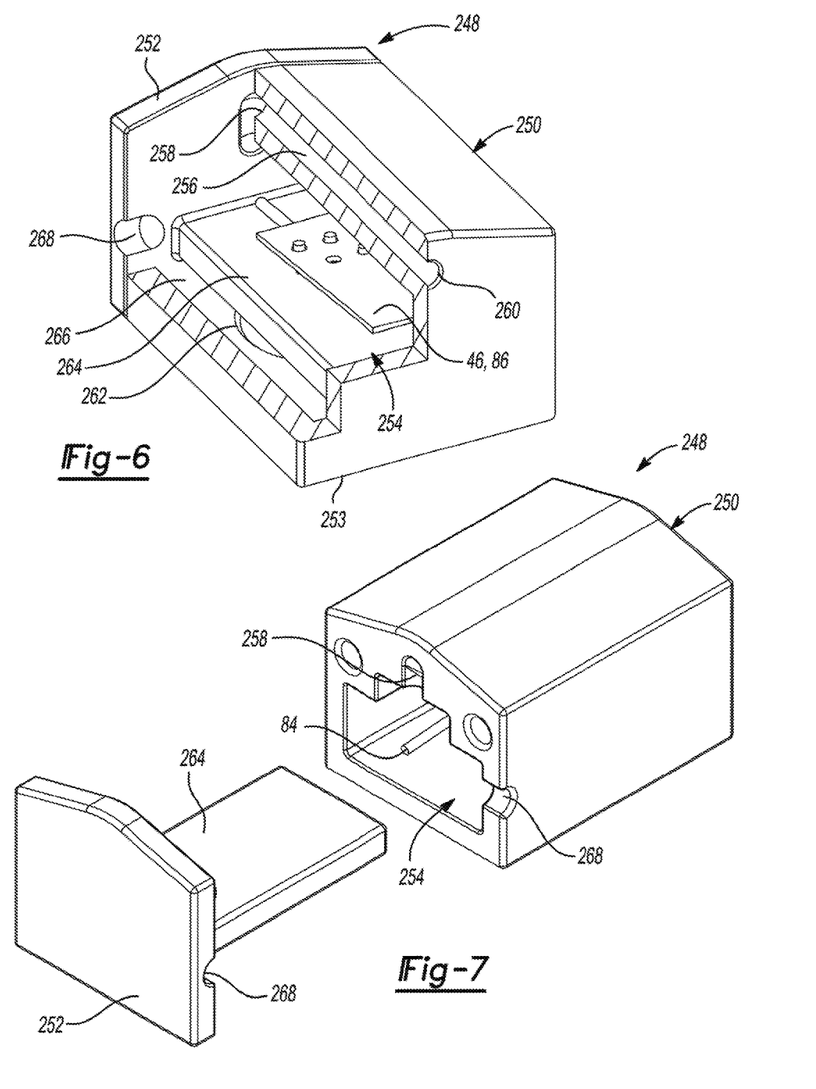
FIG. 6 is a partially cross-sectioned perspective view of another slosh guard according to the principles of the present disclosure.
FIG. 7 is a partially exploded perspective view of the slosh guard of FIG. 6.

With reference to FIGS. 6 and 7, another slosh guard 248 is provided that may house either of the first and second temperature sensors 46, 86 described above. The function of the slosh guard 248 may be similar or identical to that of the slosh guard 48. The slosh guard 248 may include a housing 250 and a cap 252. The housing 250 may include a cavity 254 in which the sensor 46, 86 may be fixedly disposed. An upper portion 251 of the housing 250 may include a fluid passageway 256 having a first opening 258 providing fluid communication between the cavity 254 and the fluid passageway 256 and a second opening 260 providing fluid communication between the fluid passageway and the suction chamber 32 or lubricant sump 42. An aperture 262 may extend through a lower portion 253 of the housing 250 and fluidly communicate with the cavity 254.

The cap 252 may include a baffle 264 integrally formed therewith and extending therefrom. When the slosh guard 248 is in a fully assembled condition, the baffle 264 may be received within the cavity 254, and the cap 252 may close off the cavity 254 to enclose the sensor 46, 86 within the cavity 254. The baffle 264 may be disposed between the sensor 46, 86 and the aperture 262 in the housing 250 to shield the sensor 46, 86 from liquid that may splash into the cavity 254 through the aperture 262. One or more passages 266 may be formed in around the baffle 264 to allow the cavity 254 to be filled with liquid and allow liquid to be drained from the cavity 254 when a liquid level (e.g., the lubricant level 44) rises and falls above and below the vertical height of the aperture 262. As the cavity 254 fills with liquid when the liquid level rises above the vertical height of the aperture 262, vapor in the cavity 254 may exit through the fluid passageway 256. As liquid drains from the cavity 254 when the liquid level falls, liquid may exit through the aperture 262 and vapor from the suction chamber 32 may enter the cavity 254 through the fluid passageway 256.

It will be appreciate that the cap 252 may be secured to the housing 250 by any suitable manner, such as snap fit, press fit and/or one or more fasteners, for example. A wire passageway 268 may extend through the housing 250 and/or the cap 252 to allow wires 84 of the sensor 46, 86 to exit the cavity 254. In some embodiments, a portion of the first opening 258 may be formed in the cap 252.

Figure 8:
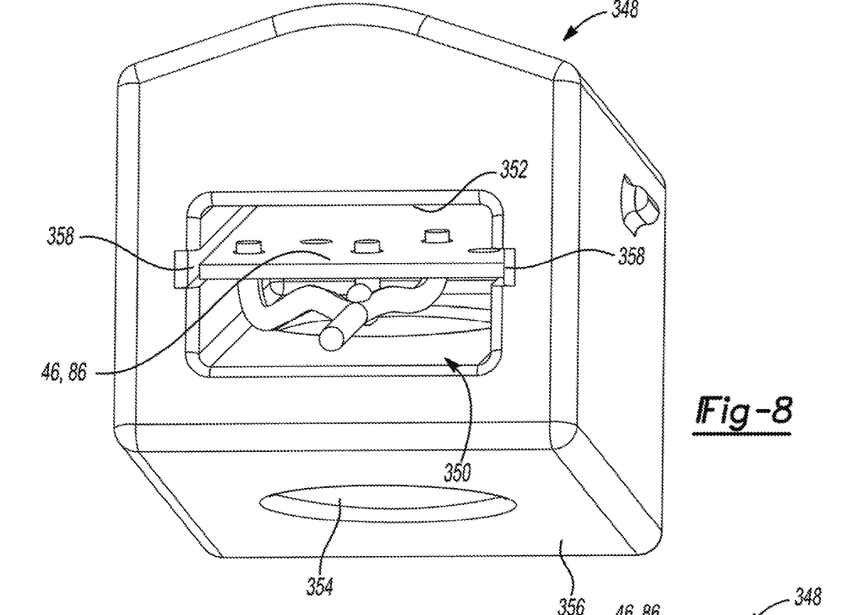
FIG. 8 is a perspective view of another slosh guard according to the principles of the present disclosure.
Figure 9:
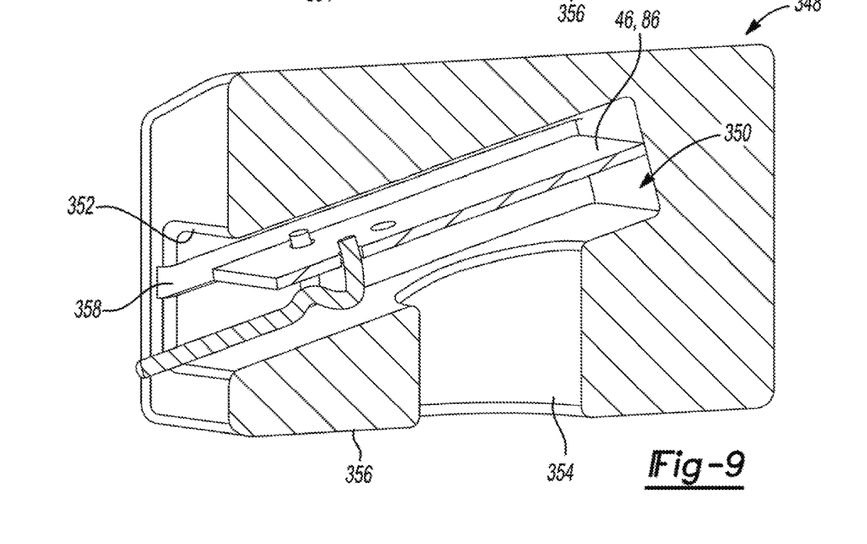
FIG. 9 is a perspective cross-sectional view of the slosh guard of FIG. 8.

With reference to FIGS. 8 and 9, another slosh guard 348 is provided that may house either of the first and second temperature sensors 46, 86 described above. The slosh guard 348 may be molded as a single, unitary body having a cavity 350 in which the sensor 46, 86 may be fixedly received. The cavity 350 may have an open end 352 through which the sensor 46, 86 can be received during installation of the sensor 46, 86 into the slosh guard 348. In some embodiments, the open end 352 may be closed off by a structure within the compressor 10 (e.g., a bearing housing, shell or other structure) to which the slosh guard 348 is mounted. An aperture 354 may extend through a lower portion 356 of the slosh guard 348 and may fluidly communicate with the cavity 350. In some embodiments, a baffle (not shown) may be disposed between the sensor 46, 86 and the aperture 354 to shield the sensor 46, 86 from liquid that may splash up through the aperture 354. Liquid may be allowed to flow around the baffle through one or more passages (not shown), as described above. A pair of slots 358 formed in the cavity 350 may hold the sensor 46, 86 at an angle relative to the aperture 354 so that any liquid that splashes through the aperture 354 or the open end 352 may drip off of the sensor 46, 86.

Figure 10:
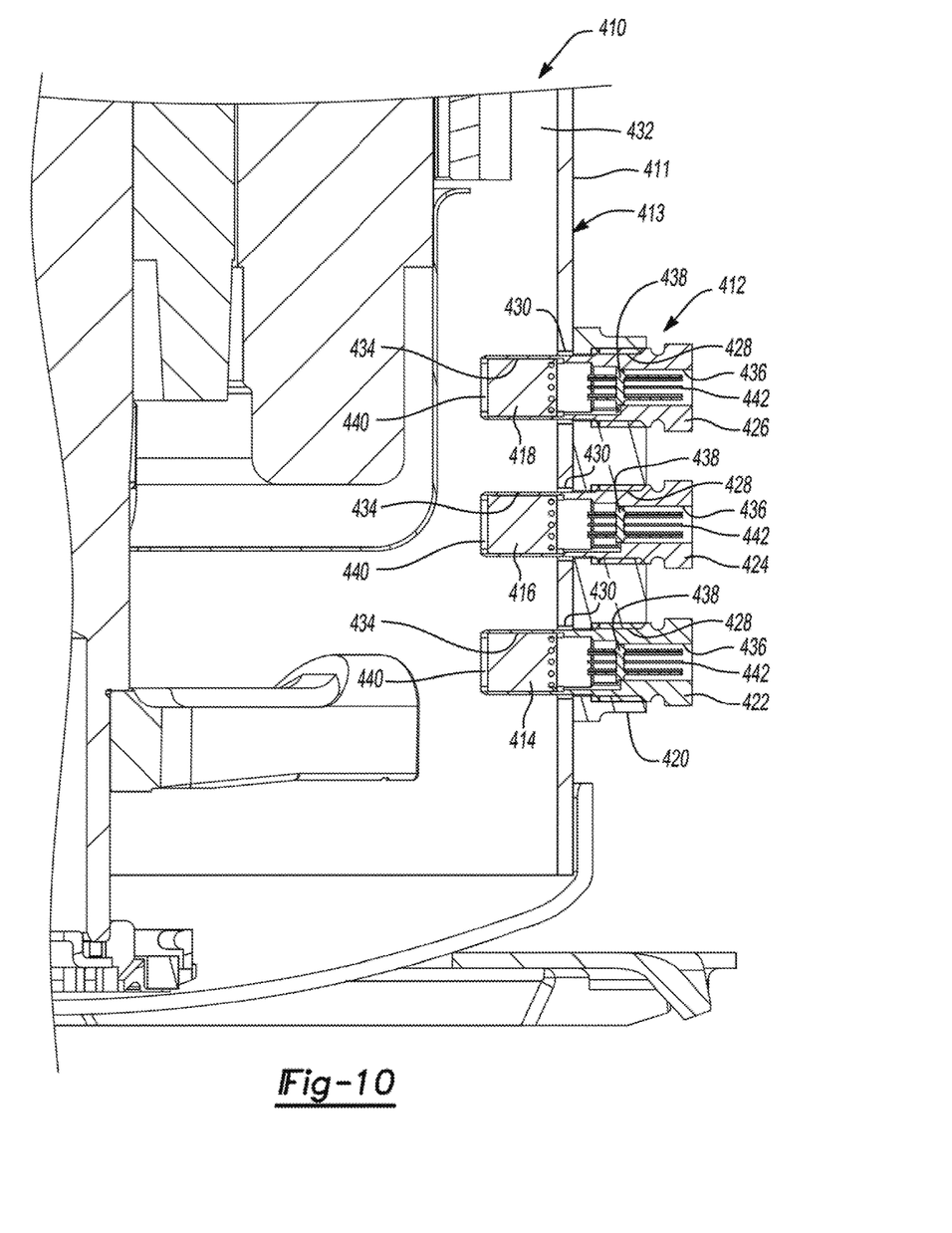
FIG. 10 is a partial cross-sectional view of another compressor having sensors according to the principles of the present disclosure.

With reference to FIG. 10, a compressor 410 is provided that includes a sensor housing 412 and a plurality of sensors 414, 416, 418 disposed within the sensor housing 412. The compressor 410 may be similar or identical to the compressor 10 described above, apart from any exceptions described herein and/or shown in the figures. The structure and function of sensors 414, 416, 418 may be similar or identical to that of the sensors 46, 22, 86, respectively. Therefore, similar features will not be described again in detail.

The sensor housing 412 may include a hub 420 and first, second and third plugs 422, 424, 426 sealingly received in apertures 428 in the hub 420. The hub 420 may be mounted to an outer surface 411 of a shell 413 of the compressor 410. The apertures 428 in the hub 420 may be aligned with corresponding apertures 430 in the shell 413 so that the plugs 422, 424, 426 extend through the apertures 430 and into an internal chamber 432 defined by the shell 413.

Each of the plugs 422, 424, 426 may include first and second cavities 434, 436 with a partition 438 separating the cavities 434, 436. The sensors 414, 416, 418 may be disposed within the first cavities 434. Each of the first cavities 434 includes one or more openings 440 that provide fluid communication between the internal chamber 432 and the first cavity 434. In this manner, the sensors 414, 416, 418 are exposed to fluid within the internal chamber 432 while still being relatively protected from splashing and sloshing liquids within the internal chamber 432. Wires 442 connected to the sensors 414, 416, 418 are sealingly received through the partition 438 and may extend out of the second cavities 436 toward a control module associated with the compressor 410.

Figure 11:
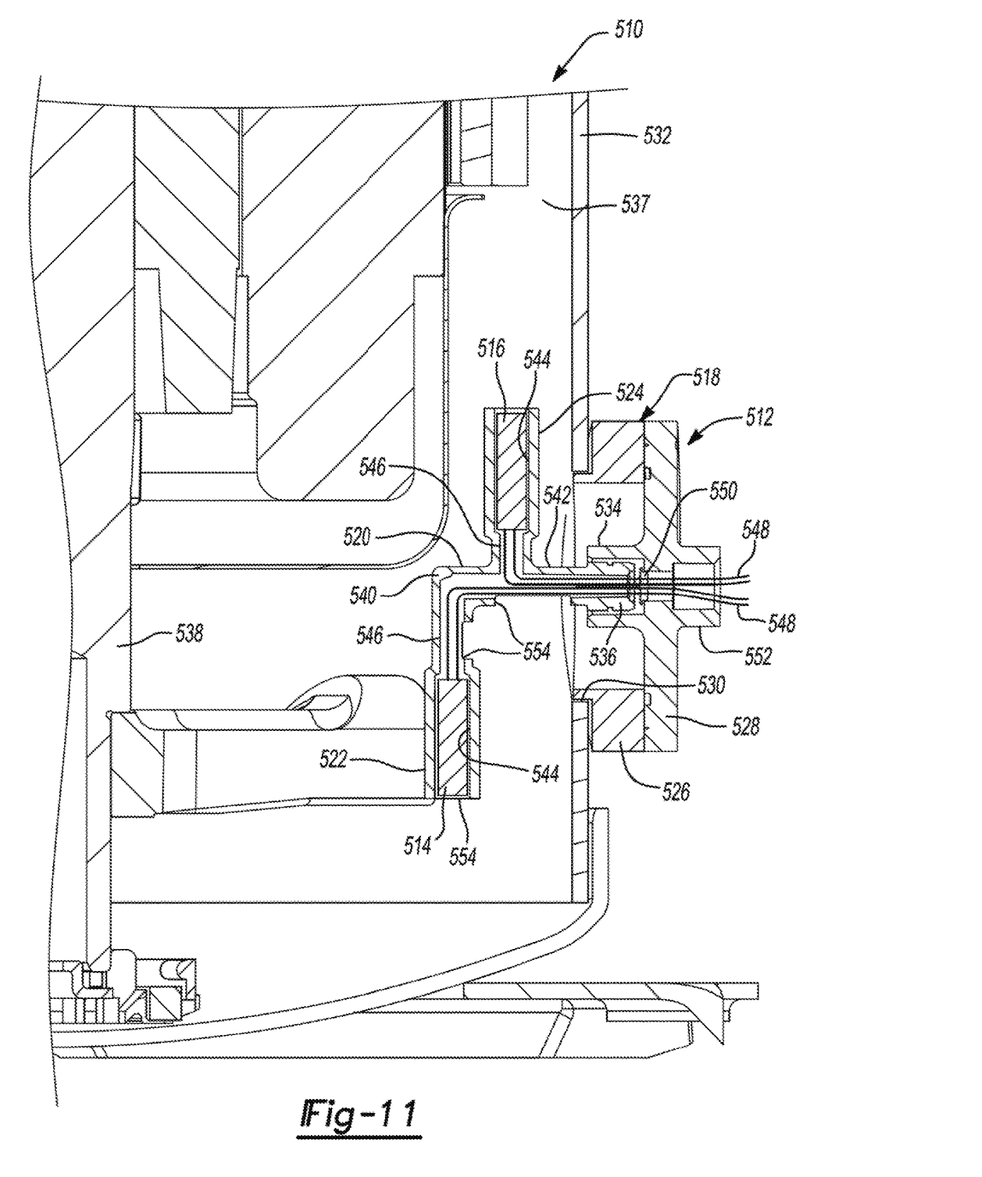
FIG. 11 is a partial cross-sectional view of yet another compressor having sensors according to the principles of the present disclosure.

With reference to FIG. 11, a compressor 510 is provided that includes a sensor housing 512 and a plurality of sensors 514, 516 disposed within the sensor housing 512. The compressor 510 may be similar or identical to the compressor 10 described above, apart from any exceptions described herein and/or shown in the figures. The structure and function of sensors 514, 516 may be similar or identical to that of the sensors 46, 86, respectively. Therefore, similar features will not be described again in detail.

The sensor housing 512 may include a hub 518, a conduit 520, a first casing 522 and a second casing 524. The hub 518 may include an annular base portion 526 and a flange portion 528. The base portion 526 may be sealingly received in an opening 530 in a shell 532 of the compressor 510. The flange portion 528 may be sealingly mounted to the base portion 526 or integrally formed therewith. The flange portion 528 may include a central boss 534 that sealingly receives a first end 536 of the conduit 520.

The conduit 520 may be a generally tubular member and may be integrally formed with the first and second casings 522, 524. The conduit 520 may extend from the hub 518 radially inward (i.e., in a direction perpendicular to an axis of rotation of a crankshaft 538 of the compressor 510) into an interior chamber 537 of the compressor 510. The first casing 522 may extend axially downward (i.e., in a direction parallel to the axis of rotation of the crankshaft 538) from a second end 540 of the conduit 520. The second casing 524 may extend axially upward from an intermediate portion 542 of the conduit 520.

While the first and second casings 522, 524 are shown in FIG. 11 as being axially misaligned with each other, in some embodiments, the first and second casings 522, 524 could be axially aligned with each other. In some embodiments, the axial misalignment between the first and second casings 522, 524 allows for easier insertion of the casings 522, 524 and conduit 520 through the opening 530 in the shell 532 during installation of the sensor housing 512. That is, with the casings 522, 524 being axially misaligned with each other, the casings 522, 524 and conduit 520 can be more easily inserted through a relatively smaller-diameter opening 530. The opening 530 may need a relatively larger diameter to enable axially aligned casings of the same size to fit therethrough.

Each of the first and second casings 522, 524 may include a cavity 544 and a tubular stem 546. The cavities 544 are in communication with the conduit 520 through the stems 546. The sensors 514, 516 may be received within the cavities 544. Wires 548 electrically connected with the sensors 514, 516 may extend from the sensors 514, 516 through the stems 546, through the conduit 520 and through a hermetically sealed plug 550 sealingly fixed to the flange portion 528.

From the plug 550, the wires 548 may extend through another boss 552 of the flange portion 528 and may be electrically connected with a control module associated with the compressor 510.

The casings 522, 524 and/or the conduit 520 may include one or more openings 554 to allow fluid to flow into an out of the cavities 544 of the casings 522, 524 while the casings 522, 524 protect the sensors 514, 516 from splashing and sloshing liquid within the shell 532.

Figure 12:
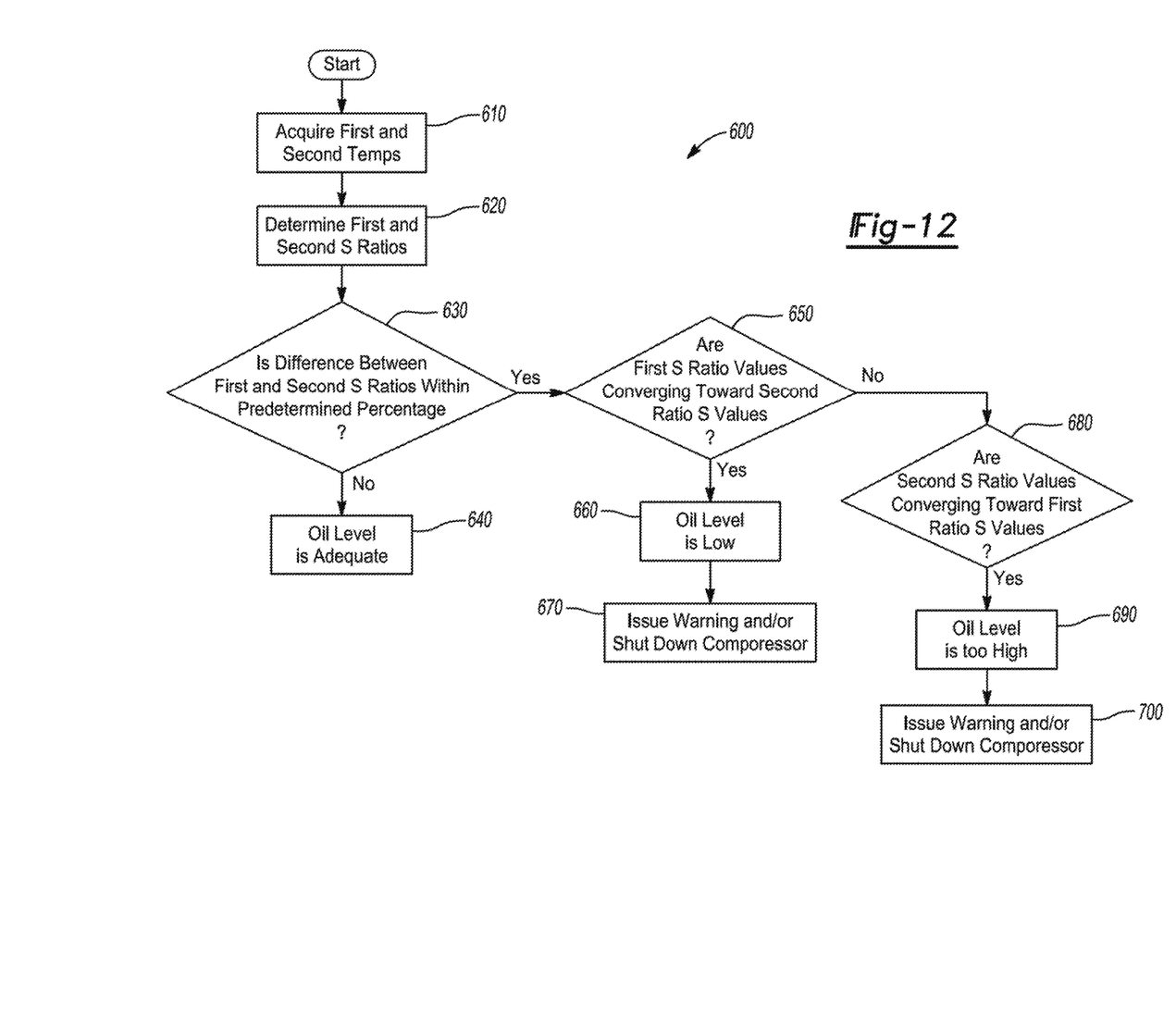
FIG. 12 is a flowchart illustrating another method for determining lubricant level in a compressor.

With reference to FIG. 12, another method 600 will be described in which the control module 24 may determine whether the lubricant level 44 in the compressor 10 is at a predetermined level (or within a predetermined range of levels). While the method 600 will be described herein with reference to the compressor 10 and sensors 46, 86, it will be appreciated that the method 600 is also applicable to the compressors 410, 510 and sensors 414, 418, 514, 516.

At step 610, the control module 24 may acquire first and second temperature measurements T1, T2 from the first and second temperature sensors 46, 86, respectively. The first and second temperature measurements can be acquired continuously or intermittently and stored in a memory module associated with the control module 24. At step 620, the control module 24 may determine a first S ratio $S_1$ and a second S ratio $S_2$ based on the temperature data acquired at step 610. The first S ratio $S_1$ can be calculated according to the following equation: $S_1 = |T1-T2|/SD_1$, where $SD_1$ is the standard deviation of the first temperature data received from the first temperature sensor 46. The second S ratio $S_2$ can be calculated according to the following equation: $S_2 = |T1-T2|/SD_2$, where $SD_2$ is the standard deviation of the second temperature data received from the second temperature sensor 86. The control module 24 may continuously or intermittently calculate $S_1$ and $S_2$ store the values of $S_1$ and $S_2$ in the memory module associated with the control module 24.

At step 630, the control module 24 may determine whether a difference between the first and second S ratios $S_1$, $S_2$ is within a predetermined threshold or a predetermined percentage of either of the S ratios $S_1$, $S_2$. The predetermined percentage can be chosen to suit a given compressor and/or a given climate control system. In some embodiments, the predetermined percentage may vary based on operating conditions of the compressor 10 and/or operating conditions of the climate control system. In some embodiments, the predetermined percentage may be about five percent or between about five and ten percent, for example. It will be appreciated that the predetermined percentage could be higher than ten percent or lower than five percent. If the control module 24 determines at step 630 that the difference between the first and second S ratios $S_1$, $S_2$ is not within the predetermined percentage, then, at step 640, the control module 24 may determine that the oil level within the compressor 10 is adequate or above a predetermined level.

If the control module 24 determines at step 630 that the difference between the first and second S ratios $S_1$, $S_2$ is within the predetermined percentage, then, at step 650, the control module 24 may determine whether a plurality of the previously calculated and stored first S ratio $S_1$ values are converging toward a plurality of the previously calculated and stored second S ratio $S_2$ values. If the first S ratio $S_1$ values are converging toward the second S ratio $S_2$ values, then, at step 660, the control module 660 may determine that the oil level within the compressor 10 is low and that the compressor 10 has been losing oil. Then, at step 670, the control module 24 may issue a warning, shut down the compressor 10 and/or take other corrective action.

If the control module 24 determines at step 650 that the first S ratio $S_1$ values are not converging toward the second S ratio $S_2$ values, then, at step 680, the control module 660 may determine whether the plurality of the previously calculated and stored second S ratio $S_2$ values are converging toward the plurality of the previously calculated and stored first S ratio $S_1$ values. If the second S ratio $S_2$ values are converging toward the first S ratio $S_1$ values, then, at step 690, the control module 660 may determine that the oil level is too high. Then, at step 700, the control module 24 may issue a warning, shut down the compressor 10 and/or take other corrective action.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term 'module' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A compressor comprising:
   a shell defining a chamber;
   a compression mechanism disposed within the chamber and operable to compress a working fluid; and
   a sensor assembly including a first sensor, a second sensor, and a sensor housing, the first and second sensors are disposed at least partially inside of the chamber and are supported by the sensor housing, the sensor housing is mounted to the shell and is at least partially disposed outside of the shell,
   wherein the sensor housing includes a hub, a conduit, a first casing and a second casing, the hub sealingly engaging the shell, the conduit extending radially inward into the compressor from the hub and receiving wires connected to the first and second sensors, the first casing extending axially upward from the conduit and receiving one of the first and second sensors, the second casing extending axially downward from the conduit and receiving the other of the first and second sensors.

2. The compressor of claim 1, wherein the first and second casings are axially misaligned with each other.

3. The compressor of claim 2, wherein the first casing extends axially upward from an intermediate portion of the conduit, and wherein the second casing extends axially downward from a distal end of the conduit.

4. The compressor of claim 1, wherein wires electrically connected to the first and second sensors are routed away from the shell through an aperture defined by the sensor housing.

5. The compressor of claim 1, wherein the first and second sensors are temperature sensors.

6. A compressor comprising:
a shell defining a chamber;
a compression mechanism disposed within the chamber; and
a sensor assembly including a first sensor, a second sensor, and a sensor housing, the first and second sensors are disposed at least partially inside of the chamber and are exposed to fluid within the chamber, the first and second sensors are supported by the sensor housing, the sensor housing is mounted to the shell and is at least partially disposed outside of the shell, the first and second sensors having wires electrically connected thereto and extending through the sensor housing, the sensor housing extending radially inward from the shell into the chamber such that the first and second sensors are disposed radially inward relative to the shell,
wherein the sensor housing includes a first casing and a second casing, wherein the first sensor is disposed within the first casing, wherein the second sensor is disposed within the second casing, wherein the first casing includes a first opening allowing fluid within the chamber to enter the first casing and contact the first sensor, and wherein the second casing includes a second opening allowing fluid within the chamber to enter the second casing and contact the second sensor.

7. The compressor of claim 6, wherein the sensor housing includes a hub and a conduit, the hub sealingly engaging the shell, the conduit extending radially inward into the compressor from the hub and receiving the wires, the first casing extending axially upward from the conduit, the second casing extending axially downward from the conduit.

8. The compressor of claim 7, wherein the first and second casings are axially misaligned with each other.

9. The compressor of claim 8, wherein the first casing extends axially upward from an intermediate portion of the conduit, and wherein the second casing extends axially downward from a distal end of the conduit.

10. The compressor of claim 6, wherein wires electrically connected to the first and second sensors are routed away from the shell through an aperture defined by the sensor housing.

11. A compressor comprising:
a shell defining a chamber;
a compression mechanism disposed within the chamber and operable to compress a working fluid; and
a sensor assembly including a first sensor, a second sensor, and a sensor housing, the first and second sensors are disposed at least partially inside of the chamber and are supported by the sensor housing, the sensor housing is mounted to the shell and is at least partially disposed outside of the shell, the sensor housing extending radially inward from the shell into the chamber such that the first and second sensors are disposed radially inward relative to the shell,
wherein the sensor housing includes a first casing and a second casing, wherein the first casing receives the first sensor and extends axially in a first direction, and wherein the second casing receives the second sensor and extends axially in a second direction opposite the first direction.

12. The compressor of claim 11, wherein the sensor housing includes a conduit extending radially inward into the compressor relative to the shell and receiving wires connected to the first and second sensors.

13. The compressor of claim 12, wherein the first casing extends axially upward from the conduit, and wherein the second casing extends axially downward from the conduit.

14. The compressor of claim 13, wherein the sensor housing includes a hub sealingly engaging the shell, wherein the conduit extends radially inward into the compressor from the hub.

15. The compressor of claim 13, wherein the first and second casings are axially misaligned with each other.

16. The compressor of claim 15, wherein the first casing extends axially upward from an intermediate portion of the conduit, and wherein the second casing extends axially downward from a distal end of the conduit.

17. The compressor of claim 11, wherein wires electrically connected to the first and second sensors are routed away from the shell through an aperture defined by the sensor housing.

18. The compressor of claim 11, wherein the first and second sensors are temperature sensors.

* * * * *